United States Patent
Books et al.

(10) Patent No.: US 8,602,142 B2
(45) Date of Patent: Dec. 10, 2013

(54) HYBRID VEHICLE BRAKING ADJUSTMENT FOR VEHICLE WEIGHT

(75) Inventors: Martin Books, Columbus, IN (US); Praveen Muralidhar, Greenwood, IN (US)

(73) Assignee: Cummins Inc., Colombus, IN (US)

( * ) Notice: Subject to any disclaimer, the term of this patent is extended or adjusted under 35 U.S.C. 154(b) by 0 days.

(21) Appl. No.: 13/324,173

(22) Filed: Dec. 13, 2011

(65) Prior Publication Data

US 2013/0146374 A1    Jun. 13, 2013

(51) Int. Cl.
  *B60T 8/17* (2006.01)
(52) U.S. Cl.
  USPC ........... 180/65.21; 180/65.1; 701/22; 701/70; 903/947
(58) Field of Classification Search
  None
  See application file for complete search history.

(56) References Cited

U.S. PATENT DOCUMENTS

| | | | |
|---|---|---|---|
| 3,657,625 A | 4/1972 | Miller et al. | |
| 4,326,154 A | 4/1982 | Lewis et al. | |
| 4,962,969 A | 10/1990 | Davis | |
| 5,478,974 A * | 12/1995 | O'Dea | 177/25.14 |
| 5,915,801 A | 6/1999 | Taga et al. | |
| 6,540,035 B2 | 4/2003 | Nagano et al. | |
| 6,571,165 B2 * | 5/2003 | Maruko et al. | 701/93 |
| 7,311,163 B2 | 12/2007 | Oliver | |
| 2009/0171522 A1 | 7/2009 | Luo et al. | |
| 2009/0266631 A1 * | 10/2009 | Kikuchi | 180/65.265 |

* cited by examiner

*Primary Examiner* — Katy M Ebner
*Assistant Examiner* — Hilary L Johns
(74) *Attorney, Agent, or Firm* — Krieg DeVault LLP

(57) ABSTRACT

A method, apparatus, and system are disclosed for hybrid power system braking. In one embodiment, a vehicle weight input is received by a brake controller. In response to receiving the vehicle weight input, a maximum negative braking torque is determined. Regulation of negative braking torque according to vehicle weight is accomplished by one or both of a regenerative braking device and mechanical braking device.

21 Claims, 3 Drawing Sheets

HYBRID VEHICLE BRAKING ADJUSTMENT FOR VEHICLE WEIGHT

BACKGROUND

Environmental concerns and limited natural resources are highlighting the desire for reduced fuel consumption. One promising avenue toward the reduction of fuel consumption is the use of hybrid powertrains. Many hybrid powertrains utilize regenerative braking to increase the overall efficiency of the system. Regenerative braking recovers kinetic energy from a moving vehicle and utilizes the recovered energy to store electrical potential energy. In presently available hybrid powertrain systems, regenerative braking can be triggered by means other than actuation of the brake pedal, such as by lifting of the accelerator pedal. This creates difficulties in regulating the maximum breaking, particularly in vehicles where vehicle weight widely varies due to cargo loading, which results in widely variable braking requirements. Too little regenerative braking on, for example, a heavily loaded vehicle can produce inadequate deceleration causing the operator to depend more on friction braking and harm fuel economy and increase brake wear. Too much regenerative braking on an empty or lightly loaded vehicle can cause excessive deceleration and possible traction control issues on the roadway. Therefore, further technological developments are desirable in this area.

SUMMARY

One embodiment is a unique system and method for hybrid power system braking adjustment. Other embodiments include unique methods, systems, and apparatus to achieve a driver selected maximum hybrid negative braking torque upon a deceleration request that is based on a vehicle cargo weight. Further embodiments, forms, objects, features, advantages, aspects, and benefits shall become apparent from the following description and drawings.

DESCRIPTION OF THE ILLUSTRATIVE EMBODIMENTS

Figure 1:
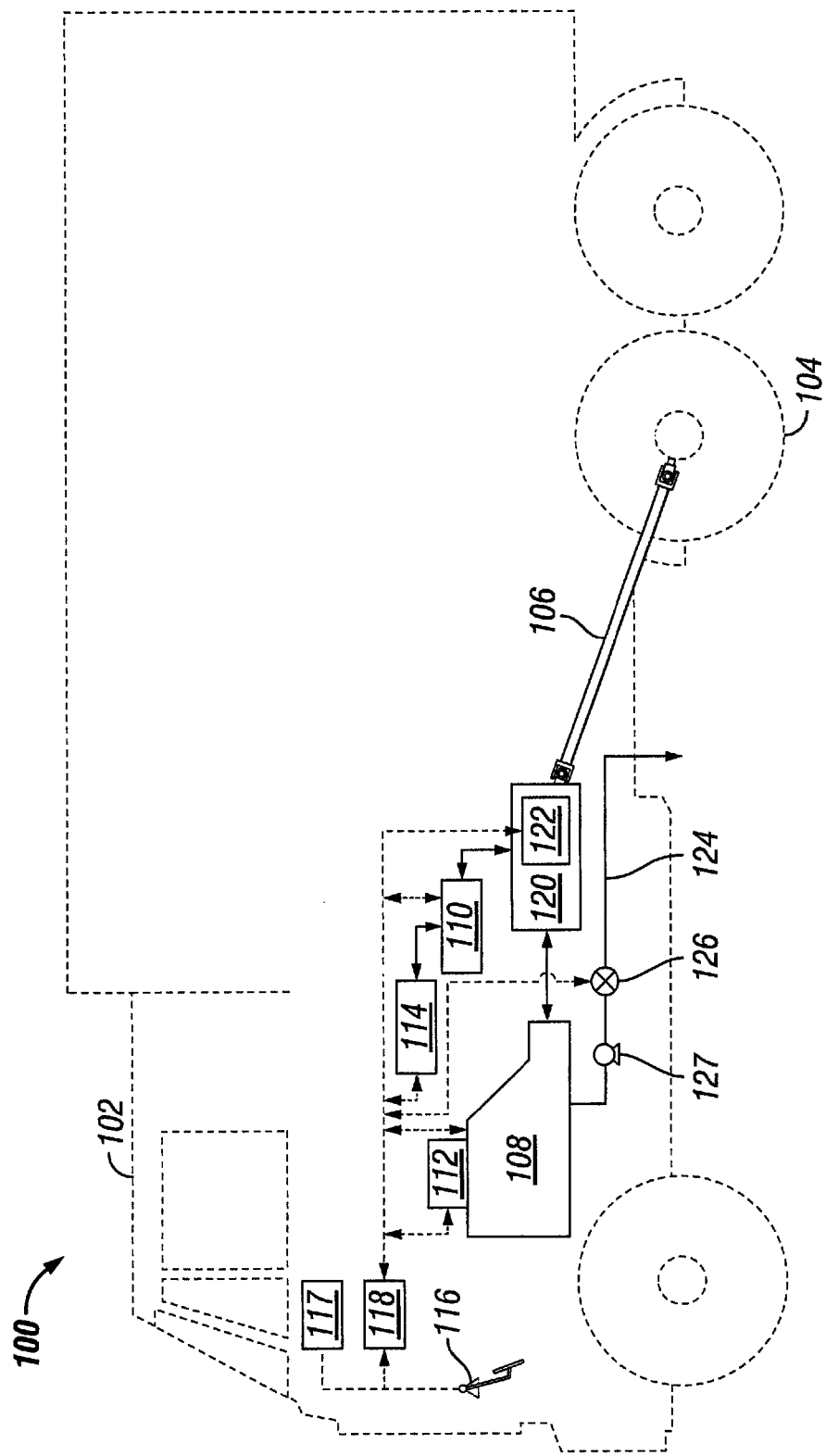
FIG. 1 is a schematic block diagram for managing hybrid power train braking.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, an exemplary system 100 includes a vehicle 102 that includes cargo carrying capability, although system 100 is not limited to cargo carrying vehicles. System 100 further includes a hybrid power train having an internal combustion engine 108 and an electric device 110 selectively coupled to a drive shaft 106. The engine 108 may be any type of internal combustion engine known in the art. In some applications, the internal combustion engine 108 may be a diesel engine. In the example of FIG. 1, the engine 108 and electric device 110 are coupled to the driveshaft 106 through a transmission 120 having a power splitter (not shown). However, any hybrid configuration known in the art, including at least series, parallel, and series-parallel, is contemplated herein.

The system 100 further includes an electric generator that is selectively coupled to the drive shaft 106 and further coupled to an electrical energy storage device 114. The electric generator in FIG. 1 is included with the electric device 110 as an electric motor/generator. However, the electric generator may be a separate device. Electrical energy storage device 114 is electrically connected to the generator 110 to store electricity generated by the generator 110. The electrical energy storage device 114 can be a battery such as a lithium ion battery, a lead-acid battery, a nickel metal hydride battery, or any other device capable of storing electrical energy. In certain embodiments, energy may be stored non-electrically, for example in a high performance flywheel, in a compressed air tank, and/or through deflection of a high capacity spring. Where the energy is stored electrically, any electrical energy storage device 114 is contemplated herein, including a hyper-capacitor and/or an ultra-capacitor.

In certain embodiments, the system 100 includes the drive shaft 106 mechanically coupling the hybrid power train to a vehicle drive wheel 104. The system 100 may include any other type of load other than or in addition to a drive wheel 104, for example any load that includes stored kinetic energy that may intermittently be slowed by any braking device included in the hybrid power train. An exemplary system 100 includes a mechanical braking device that is responsive to the mechanical braking command.

An exemplary mechanical braking device includes a compression braking device 112, for example a device that adjusts the valve timing of the engine 108 such that the engine becomes a torque absorber rather than a torque producer. Another exemplary mechanical braking device includes an exhaust throttle 126 (or exhaust brake) that, in moving toward a closed position, partially blocks an exhaust stream 124 and applies back pressure on the engine resulting in a negative crankshaft torque amount. Yet another exemplary mechanical braking device is a variable geometry turbocharger (VGT) 127. Certain VGT 127 devices can be adjusted to produce back pressure on the engine 108 and provide a braking effect. Still another exemplary mechanical braking device includes a hydraulic retarder 122. The hydraulic retarder 122, where present, is typically incorporated with the transmission 120. The mechanical braking device may be any braking device which is not the conventional friction brakes of the vehicle (or application for a non-vehicle embodiment) or the electric device 110, and the described examples are not exclusive.

In certain embodiments, the system 100 includes a compression braking disable switch (not shown). The compression braking disable switch indicates that engine compression braking is not to be utilized when the switch is in a certain position. The use of a compression braking disable switch is common in cities or other areas where compression braking is not allowed by regulation or desired by the operator. The compression braking disable switch may be any device that generates a signal indicating that compression braking is disabled, and may be a toggle, rocker, push-button, or software implemented switch.

The system 100 further includes a deceleration request device 116 that provides a deceleration request value. An exemplary deceleration request device comprises a throttle pedal position sensor. However, any device understood in the art to provide a deceleration request value, or a value that can be correlated to a present negative torque request for the hybrid power train is contemplated herein. As used herein, negative braking torque includes vehicle braking provided by or able to be provided by the hybrid power train without friction braking.

The system 100 also includes a negative braking torque selector 117 in a cab of vehicle 102 that is manually operable by the operator to select a desired maximum negative braking torque according to the weight carried by the vehicle 102. The vehicle operator selector 117 provides a number of predetermined maximum negative braking torques to be supplied by system 100 based on the weight of vehicle 102. For example, the operator can select a first maximum negative braking torque for an empty or light cargo weighted vehicle, a second, greater maximum negative braking torque for a moderately weighted vehicle, and a third, greater maximum negative braking torque for a heavily weighted vehicle. Additional vehicle weight selections between these conditions are also contemplated.

In certain embodiments, the input value of selector 117 includes a maximum amount of negative braking torque that governs that negative braking torque to be applied when deceleration is requested. The selector input value may include any one or combination of an on/off type switch (e.g. negative braking torque is presently enabled or disabled), a discrete selector switch (e.g. utilize 1, 2, 3, etc. indicative of cargo weight of the vehicle), and/or a continuous selector switch (e.g. a dial providing a continuous or smooth maximum negative braking torque between a low value and a high value of maximum negative braking torque). Selector 117 can be provided in the form of a knob, switch or switches, dial, lever, push buttons, or other device manually operable by the operator to select the desired maximum negative braking torque.

As discussed further below, regenerative and mechanical braking of the hybrid power train upon generation of a deceleration request is limited or governed by the selected maximum negative braking torque to be applied by the hybrid power train. This allows fuel economy to be increased by utilizing fully available regenerative braking torque capacity through minimizing driver reliance on friction braking in heavily weighted situations. In lightly weighted scenarios, the maximum negative braking torque can be reduced, even to amounts less than the regenerative braking capacity, so that traction of the vehicle is enhanced by minimizing over-application of negative braking torque during a deceleration request. Intermediate weight selections of maximum negative braking torque allow the driver to maintain the negative torque braking effect for intermediately loaded situations and provide a consistent feel to the vehicle upon generation of a deceleration request and subsequent braking inputs.

The system 100 further includes a controller 118 having modules structured to functionally execute operations for managing hybrid power train braking. Controller 118 is linked to deceleration request device 116 and negative braking torque selector 117. In certain embodiments, the controller 118 forms a portion of a processing subsystem including one or more computing devices having memory, processing, and communication hardware. The controller 118 may be a single device or a distributed device, and the functions of the controller 118 may be performed by hardware or software.

In certain embodiments, the controller 118 includes one or more modules structured to functionally execute the operations of the controller 118. The controller 118 includes a negative torque module that interprets the deceleration request value and braking request (if any), a system capability module that interprets a regenerative braking capacity and a mechanical braking capacity, and a braking control module that provides a regenerative braking command and a mechanical braking command in response to the deceleration request value in accordance with the regenerative braking capacity, the mechanical braking capacity, and driver selected maximum negative braking torque. The braking control module can also supply a friction braking command in response to a brake pedal position.

The description herein including modules emphasizes the structural independence of the aspects of the controller 118, and illustrates one grouping of operations and responsibilities of the controller 118. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

Certain operations described herein include interpreting one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 2:
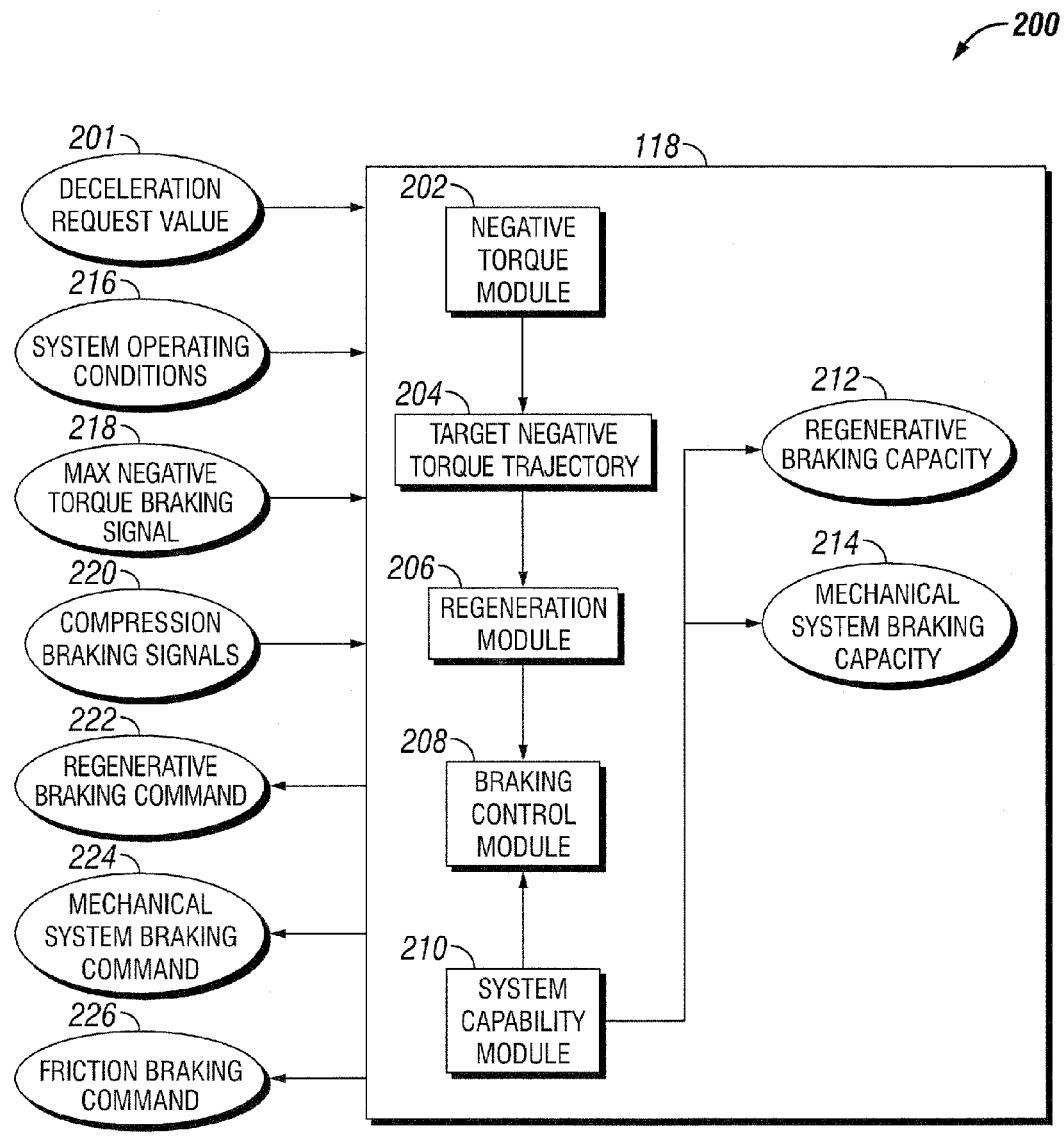
FIG. 2 is a schematic view of a controller that functionally executes certain operations for managing hybrid power train braking.

FIG. 2 is a schematic view of controller apparatus 118 for hybrid power system braking management system 200. The exemplary controller 118 includes a negative torque module 202, a target negative torque trajectory module 204, a regeneration module 206, a braking control module 208, and a system capability module 204. Specific embodiments of the controller 118 may omit certain modules or have additional modules, as will be understood by the description herein and the claims following. Negative torque module 202 receives and interprets a deceleration request value 201, system operating conditions 216 (including any braking request signal), a driver selected maximum negative braking torque signal 218 input via selector 117, and a compression braking signal 220.

The deceleration request value 201 is a quantitative description of an amount of deceleration requested for the application. Exemplary deceleration request 201 values include an accelerator pedal position being in a condition indicating a deceleration request 201—for example the accelerator pedal position within a low deadband position that is determined to be equivalent to a zero accelerator pedal position. The position of the accelerator pedal that is equivalent to a zero accelerator pedal position varies with the application and is understood to one of skill in the art. Exemplary positions include an accelerator pedal position lower than 10% of a maximum accelerator pedal position, or any other value including an accelerator pedal position lower than 30% of the maximum. In many applications, the percentage of "dead band" will be configurable by a vehicle manufacturer or an original equipment manufacturer (OEM). While the accelerator pedal position may be utilized to send a deceleration request value 201, other non-limiting accelerator indicators may be used to determine the deceleration request value 201, including an accelerator pressure or electronic drive by wire accelerator indication.

Control module 118 may also receive compression braking signal 220 according to a driver selected compression braking switch that indicates whether or not compression braking is to be employed and, in some embodiments, the amount of compression breaking desired. Control module 118 may also receive a brake pedal position signal provided by a brake pedal position sensor and/or provided by a network, datalink, or software-based communication. The brake pedal position is correlated to a braking torque request. The correlation may be determined as a function providing a braking power amount corresponding to a brake pedal depression amount. The determination of negative torque in response to a deceleration and/or braking request value may further be a function of a vehicle speed, drive shaft speed, transmission gear, or other variables understood in the art.

The exemplary controller 118 further includes a system capability module 210 that interprets a regenerative braking capacity 212 and mechanical system braking capacity 214. The regenerative braking capacity 212 is the negative torque and/or negative power available from the electric generator or motor/generator under the present operating conditions, or from any mechanical energy storage systems. Generally, the negative torque available to the generator of an electrical system is dependent upon the shaft speed of the generator. Without limitation, the temperature of the generator, the present capabilities of any power electronics associated with the generator to manage electrical flux, the present capability of an electrical storage system to receive charge (e.g. due to state-of-charge or electrical flux considerations), and/or the present capability of any dissipative system (e.g. a resistor bank or heater) to accept electrical flux may be considered in determining the regenerative braking capacity 212, dependent upon the components and considerations relevant to a particular system. In certain embodiments, the system capability module 210 further interprets the regenerative braking capacity 212 in response to a state of charge of an electrical storage device, or the amount of energy that can be stored in a mechanical device.

Mechanical braking capacity 214 includes, for example, the mechanical braking capacity of any components in the system that are capable of applying negative torque to the drive shaft and that are not either the regenerative components or the conventional friction braking components. An exemplary and non-limiting list of mechanical braking components includes a compression brake for the engine as may be limited by compression braking signal 220, a VGT capable of providing braking power, an exhaust throttle and/or exhaust brake, a hydraulic retarder, and an electrical motor providing motive force in the opposite direction of the drive shaft. The system capability module 210 may determine the total mechanical braking capacity 214 as an aggregate, and/or individual braking capacities, such as a compression braking capacity, a VGT braking capacity, a hydraulic retarder braking capacity, and/or an exhaust braking capacity. The determination of the capacities are dependent upon various operating conditions that vary for each component and that are generally known in the art.

In certain embodiments, any energy developed from braking that is converted into useful energy is treated as regenerative braking and considered in the regenerative braking capacity 212, while any energy that is not converted into useful energy is treated as mechanical braking and considered in the mechanical braking capacity 214. For example, electrical dissipation may be treated as regenerative braking capacity 212 when the heat generated thereby will be utilized (e.g. to heat a passenger cabin) and as mechanical braking capacity 214 when no useful sink for the heat generated thereby is available. In certain embodiments, all useful electrical and mechanical energy developed from braking is treated as regenerative braking. In alternate embodiments, only electrical energy provided to an electrical energy storage device is treated as regenerative braking. In other embodiments, only mechanical energy developed from braking is treated as regenerative braking.

The exemplary controller 118 further includes a braking control module 208 that provides at least one of a regenerative braking command 222 and a mechanical braking command 224 in response to the deceleration request value 201. The regenerative braking command 222 is the command to the generator(s) and/or motor/generator(s) and/or mechanical energy storage devices to provide negative torque to the drive shaft and the mechanical braking command 224 is the command to the mechanical braking components. Commands 222, 224 are limited by the operator selected maximum negative braking torque input indicated by vehicle operator selector 117 to generate maximum negative braking torque signal 218.

In an exemplary embodiment, the braking control module 208 further provides the regenerative braking command 222 as a minimum of the regenerative braking capacity 212 and the maximum negative braking torque determined via signal 218 input by the vehicle operator selector 217. In one form, the braking control module 208 provides the mechanical system braking command 224 as a minimum between the mechanical system braking capacity 214 and a supplemental braking request value, where the supplemental braking request value is a difference between the deceleration request value 201 and the regenerative braking command 222. The braking control module 208 further provides friction braking command 226 to satisfy any portion of the deceleration request input signal and braking request signal that is not satisfied by the regenerative braking command 222 and mechanical system braking command 224.

In one form, the braking control module 208 provides the regenerative braking command 222 and the mechanical system braking command 224 to satisfy deceleration request value 201 by maximizing, in order, first the regenerative braking command 222 as limited by the operator selected maximum negative braking torque, and then if necessary the mechanical braking command 224, as limited by the operator selected maximum negative braking torque. The friction braking command 226 is then applied to the extent necessary to achieve any other braking request signal. The mechanical braking command 224 may be divided into one or more of a compression braking command, a VGT braking command, a hydraulic retarder braking command, and/or an exhaust braking command. The command list provided is not exhaustive, and any other braking device in the system may receive a braking command individually, or be included under the mechanical braking command 224. The various braking devices are responsive to the braking commands 222, 224, 226. For example, a master cylinder pressure or other control mechanism is manipulated to provide the braking indicated by the friction braking command 226.

Figure 3:
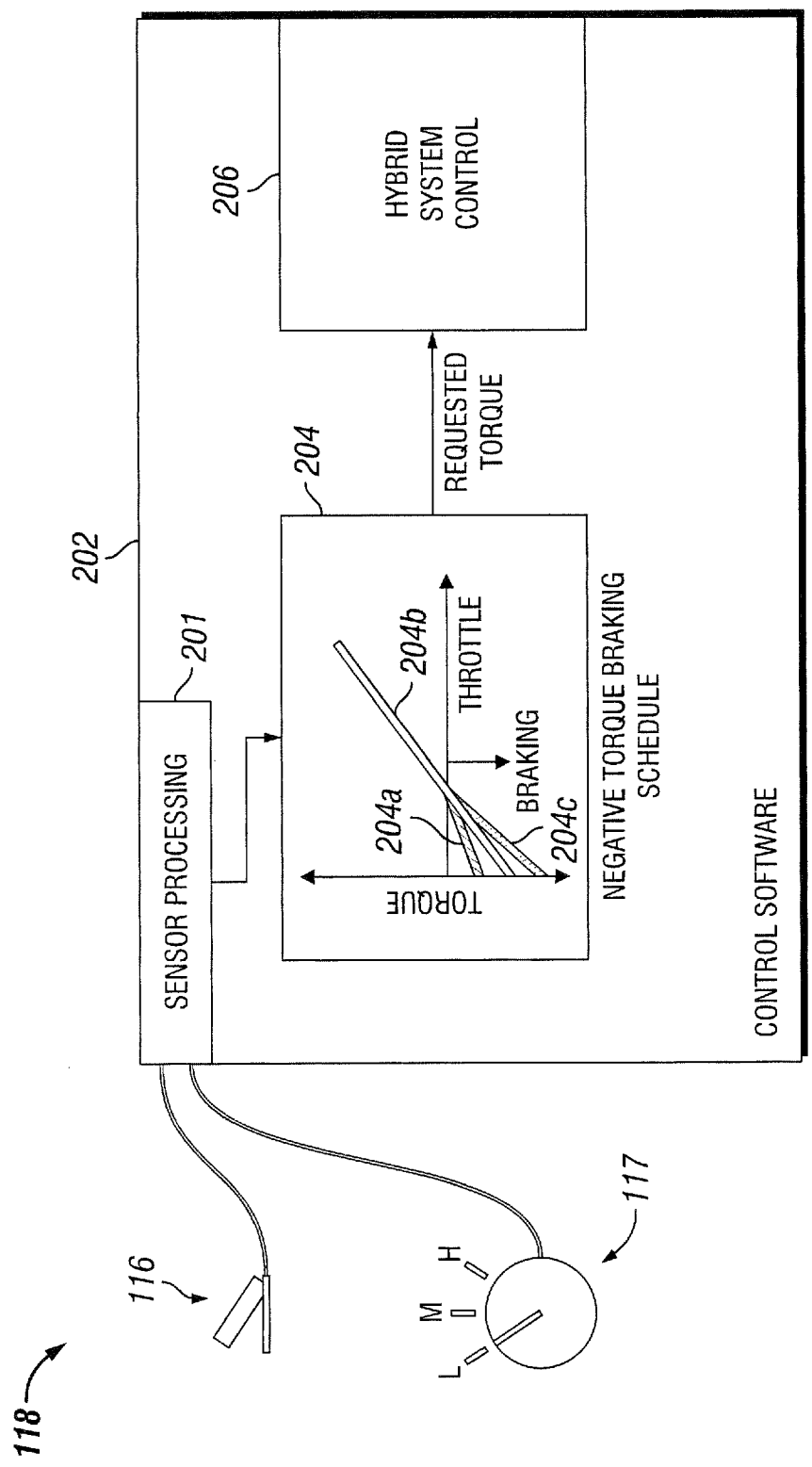
FIG. 3 is a schematic flow diagram of a procedure for managing hybrid power train braking.

Referring further to FIG. 3, an exemplary operation includes the negative torque module 202 and a number of target negative braking torque trajectories 204*a*, 204*b*, 204*c* stored in module 204 that limit the regenerative braking command and mechanical braking command based on cargo and/or vehicle weight input by the operator via operator weight selector 117. For example, target negative braking torque trajectory 204*a* provides the least maximum negative braking torque for a deceleration request and is employed in a vehicle that little or no cargo weight to provide more limited regenerative and/or mechanical braking in response to a deceleration request signal. In contrast, target negative braking torque trajectory 204*c* provides the greatest maximum negative breaking torque upon a deceleration request signal and could be employed with a heavy vehicle carrying a large cargo weight.

Negative torque module 202 selects from among the number of target negative braking torque trajectories 204*a*, 204*b*, 204*c* based on maximum negative torque braking signal 218 input from operator weight selector 117, the position of pedal 116, and system operating conditions 216 to provide a target negative torque trajectory 204 that is limited by one of the maximum negative braking torque trajectory 204*a*, 204*b*, 204*c* selected for the given set of input conditions. The selected negative braking torque trajectory is input into regeneration module 206 which provides a regenerative braking output and mechanical braking output to braking control module 208 that limits negative braking torque, even if regenerative braking capacity 212 and mechanical system braking capacity 214 exceed the negative braking torque request.

Another exemplary operation includes the target negative torque trajectory module 204 adjusting a baseline target maximum negative torque trajectory 204*a*, 204*b*, 204*c* with values from a look up table or tabulated set of values in response to the inputted vehicle weight, engine speed, vehicle speed, and/or engine or hybrid power train load. The look up table or tabulated set of values are referenced by utilizing a nearest value, an interpolated value, an extrapolated value, and/or a limited value at the end points of the table or tabulated values. The look up table or tabulated set of values may, additionally or alternatively, be referenced by any other operations understood in the art.

The selected maximum negative braking torque 204*a*, 204*b*, 204*c* and corresponding regenerative and mechanical braking outputs are then applied by braking control module 208 to limit or control the amount of regenerative braking caused by regenerative braking command 222 communicated to the generator, to an electrical energy dissipation device, and/or to a mechanical energy storage device and to limit or control the mechanical braking caused by mechanical system braking command 224 to the mechanical braking components. The generator, electrical energy dissipation devices, and/or mechanical energy storage devices are responsive to the regenerative braking command 222 and the mechanical components are responsive to the mechanical system braking command 224. Accordingly, the braking control module 208 provides commands 222, 224 so the generator and any other electrical or mechanical energy dissipation and storage devices are limited to supply regenerative braking and the mechanical components are limited to supply mechanical braking that is governed in accordance with the operator selected weight conditions of vehicle 102. If the deceleration request 201 cannot be satisfied by the maximum permissible negative braking torque, then additional braking is supplied by the operator with frictional braking systems as discussed herein.

It is understood that, during transient events or at certain operating conditions, the generator and other electrical and mechanical energy dissipation and storage devices and the mechanical systems may be unable to achieve the instantaneous response required to limit braking to the limits established by the operator selection. In certain embodiments, operations of the controller 118 to smooth the torque response or to limit the torque outputs of the generator and/or electrical and mechanical energy dissipation and storage devices and mechanical devices to physically realizable limits, such that the maximum negative braking torque may be exceeded over a brief period of operation are nevertheless understood to be operations to limit negative braking torque based on operator input of vehicle weight conditions.

The operations of selector 117 and the controller 118 thereby provide for a consistent negative braking torque for a given deceleration request 201 at various vehicular weight conditions. Accordingly, the operator of a vehicle including the selector 117 and controller 118 is provided with a negative torque braking response that is consistent for accelerator pedal operations over a wide range of vehicle weights.

In some embodiments, in which the powertrain consists of one electrical device having motor capability and one electrical device having generator capability (e.g. two motor/generators), the two electrical devices dissipate electrical energy, with one device operating as a motor in a regenerative torque mode and the other device operating as a generator and providing power to the motor. An exemplary system including two electrical devices is a combined series-parallel architecture with an intermediate clutch. A configuration including two electrical devices, accordingly, convert the kinetic energy of the vehicle into electrical energy, and dissipate the electrical energy.

An exemplary embodiment includes a single motor/generator utilized as an electrical energy dissipation device (motor dissipation). The single motor oscillates between a motoring mode and a generating mode. In the motoring mode, the motor extracts stored energy from the electrical energy storage device 114 and operates in a positive torque mode. The motor then switches to a generating state, converting the kinetic energy of the vehicle into electrical energy to be stored in the electrical energy storage device 114. Accordingly, the motor/generator provides regenerative (negative) torque to the driveline at all times during the deceleration, while successively charging and discharging the electrical energy storage device 114. The frequency of oscillation, and the charge levels of the electrical energy storage device 114 are selectable.

Yet another exemplary electrical energy dissipation device is a generator 110. The generator 110 charges the electrical energy storage device 114 at a variable efficiency value, where the variable efficiency value is either controllable and/or known during the operations of the system. As the electrical energy storage device 114 is charged, the generator 110 responds to an efficiency command to charge the electrical energy storage device 114 with a selectable efficiency. An exemplary efficiency adjustment operation includes reducing the charging efficiency of the generator as the electrical energy storage device 114 approaches a maximum charging capacity. Accordingly, a portion of the kinetic energy of the vehicle is turned into heat within the generator 110 and a portion of the kinetic energy of the vehicle is turned into electrical energy stored in the electrical energy storage device 114. Exemplary operations to adjust the efficiency of the generator 110 include adjusting the amperage in the coils of the generator 110 (e.g. for a generator 110 having an electromagnetic coil), adjusting the operating position of the generator 110 on an operational curve (e.g. where the efficiency of the generator 110 varies with generator speed and/or load), adjusting an operating temperature of the generator 110 (e.g. by adjusting a flow of coolant in thermal contact with the generator 110), or by any other method known to one of ordinary skill in the art to adjust generator efficiency.

In some embodiments of the present invention, the regenerative braking devices include certain devices having modal behavior such as discrete available braking levels, and other devices having continuous or semi-continuous behavior. An exemplary operation includes a modal device providing a regenerative (negative) torque output, and a continuous device smoothing the negative torque output such that the system proceeds smoothly from one negative torque value to another negative torque value, or proceeds smoothly along the target negative torque trajectory 204. Exemplary modal devices include a motor/generator switching modes in the four quadrants (e.g. dithering between negative torque motoring and generating). The described modal and continuous devices are exemplary and non-limiting.

As is evident from the figures and text presented above, a variety of embodiments according to the present invention are contemplated.

In one embodiment of the present invention, in response to receiving a deceleration input request, a maximum negative braking torque trajectory is determined that is based on the weight of the vehicle. To achieve the target maximum negative torque trajectory, negative torque braking is provided regenerative braking devices that by converting kinetic energy into electrical energy, heat energy, and/or mechanical energy, and mechanical braking is provided by at least one mechanical braking device. The maximum negative braking torque may be adjusted by the vehicle operator in response to various weight conditions of the vehicle.

In yet another embodiment of the present invention, a maximum negative braking torque is selected according to vehicle weight and is utilized throughout a deceleration request event thereby providing a vehicle operator with a more consistent deceleration feel over a range of vehicle weights.

The operational descriptions which follow provides illustrative embodiments of performing procedures for managing hybrid power train deceleration. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An exemplary procedure for managing hybrid power train deceleration includes an operation to interpret an operator deceleration request value and an operation to determine a negative torque braking capacity from regenerative and mechanical braking. The procedure further includes determining a maximum negative braking torque according to a weight of the vehicle input by the operator. An operation determines a regenerative braking command and mechanical braking command to achieve the deceleration request value that are limited by the maximum negative braking torque even if the regenerative braking capacity and mechanical braking capacity can provide a negative braking torque that is greater than the maximum negative braking torque.

Certain additional or alternative operations of the exemplary procedure are described following. The procedure includes an operation to provide the negative torque braking command by determining a minimum between the regenerative and mechanical braking capacity and the maximum negative braking torque that can be varied according to the vehicle weight input by the operator.

In a further refinement of the procedure, the operation determines a supplemental braking request value by subtracting from the deceleration request value the regenerative braking capacity. Mechanical braking is then employed to the extent necessary to achieve the deceleration request value.

Yet another exemplary procedure for managing hybrid power train braking follows. The exemplary procedure includes an operation to interpret an operator deceleration request value and an operation to provide deceleration commands to achieve the operator deceleration request value. The operation to provide deceleration commands includes, in order, providing a regenerative braking command and then a mechanical braking command that are limited by an operator input of vehicle weight conditions to achieve the operator deceleration request value. Should additional deceleration be required or a braking request value also be provided, then a friction braking command can be provided to achieve the overall braking request. The operation to interpret the operator deceleration request value includes determining an accelerator pedal position.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising: receiving a vehicle weight input from a vehicle operator selector; in response to receiving the vehicle weight input, determining a maximum negative braking torque trajectory; and limiting negative braking torque of the vehicle without friction braking to the maximum negative braking torque trajectory in response to a deceleration request.

2. The method of claim 1, wherein the vehicle operator selector includes a plurality of vehicle weight selections and further comprising, in response to the vehicle weight input, adjusting the maximum negative braking torque trajectory.

3. The method of claim 1, wherein the deceleration request is received from at least determining an accelerator pedal position.

4. The method of claim 1, wherein limiting negative braking torque further comprises dissipating electrical energy with a device selected from the group of devices consisting of motors, generators, and combined motor/generators.

5. The method of claim 1, wherein limiting negative braking torque further comprises dissipating mechanical energy with a mechanical energy storage device.

6. The method of claim 1, further comprising manually changing the vehicle weight input with the vehicle operator selector.

7. The method of claim 1, further comprising determining the maximum negative braking torque trajectory from a negative torque braking schedule of negative torque trajectories that vary according to vehicle weight.

8. The method of claim 1, wherein limiting negative braking torque includes generating a regenerative braking command and a mechanical braking command that are limited by the maximum negative braking torque trajectory.

9. A method, comprising: operating a vehicle having a drive system, the vehicle performing intermittent deceleration; receiving a vehicle weight input from a vehicle operator selector; receiving a deceleration input; in response at least in part to the vehicle weight input, determining a maximum negative braking torque; and in response to the deceleration input, limiting negative braking torque without friction braking to the maximum negative braking torque while decelerating the vehicle and converting a portion of kinetic energy of the drive system into stored energy.

10. The method of claim 9, wherein the deceleration input is received from determining an accelerator pedal position.

11. The method of claim 9, further comprising determining the maximum negative braking torque from a negative torque braking schedule of negative torque trajectories that vary according to vehicle weight.

12. The method of claim 9, wherein the vehicle operator selector is located in a cab of the vehicle.

13. The method of claim 9, wherein limiting negative braking torque includes generating a regenerative braking command and a mechanical braking command to decelerate the vehicle.

14. An apparatus, comprising: a controller structured to receive a vehicle weight input; means for determining a maximum negative braking torque in response to the vehicle weight input; and means for limiting negative braking torque without friction braking to the maximum negative braking torque upon receipt of a deceleration request signal.

15. The apparatus of claim 14, further comprising means for adjusting the maximum negative braking torque in response to a change in the vehicle weight input.

16. A system, comprising: a powertrain including an internal combustion engine and an electrical device; a controller in communication the engine and the electrical device structured to receive a vehicle weight signal, the controller further comprising: a negative torque module structured to receive a deceleration request signal; a target negative braking torque trajectory module structured to determine a maximum negative braking torque trajectory without friction braking in response to the vehicle weight signal; and a regeneration module structured to provide a regenerative braking torque and a mechanical braking torque that are limited by the maximum negative braking torque trajectory; and a braking control module structure to provide a regenerative braking command and a mechanical braking command based on the regenerative braking torque and the mechanical braking torque; wherein the electrical device is responsive to the regenerative braking command to dissipate electrical energy during deceleration.

17. The system of claim 16, wherein the internal combustion engine is a diesel engine and the electrical device is a motor/generator.

18. The system of claim 16, wherein the electrical device is operably coupled to an electrical energy storage device selected from the group of electrical energy storage devices consisting of lithium ion batteries, lead-acid batteries, and a nickel metal hydride batteries.

19. The system of claim 16, further comprising a system capability module structured to receive a regenerative braking capacity and a mechanical system braking capacity, wherein the regenerative braking command is limited to the minimum of the regenerative braking capacity and the maximum negative braking torque trajectory.

20. The system of claim 16, further comprising a manually operable vehicle weight selector structured to provide the vehicle weight signal.

21. The system of claim 20, wherein the powertrain comprises a portion of a vehicle with a cab for an operator of the vehicle, and vehicle weight selector is located in the cab of the vehicle.

* * * * *